United States Patent
Ripley et al.

(10) Patent No.: US 7,725,945 B2
(45) Date of Patent: May 25, 2010

(54) DISCOURAGING UNAUTHORIZED REDISTRIBUTION OF PROTECTED CONTENT BY CRYPTOGRAPHICALLY BINDING THE CONTENT TO INDIVIDUAL AUTHORIZED RECIPIENTS

(75) Inventors: Michael S. Ripley, Hillsboro, OR (US); Jeffrey B. Lotspiech, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 09/893,177

(22) Filed: Jun. 27, 2001

(65) Prior Publication Data
US 2003/0005309 A1    Jan. 2, 2003

(51) Int. Cl.
G06F 7/04 (2006.01)
H04L 9/32 (2006.01)
G06F 21/00 (2006.01)

(52) U.S. Cl. .............................. 726/27; 726/2; 726/28; 726/29; 705/51; 705/58

(58) Field of Classification Search ................. 380/228, 380/229, 241, 44, 282; 713/178, 175; 705/51, 705/58, 52; 726/2, 26–29
See application file for complete search history.

(56) References Cited

U.S. PATENT DOCUMENTS

| | | | |
|---|---|---|---|
| 4,205,343 A * | 5/1980 | Barrett ........................ 380/212 |
| 5,325,238 A * | 6/1994 | Stebbings et al. ............. 360/15 |
| 5,396,505 A * | 3/1995 | Freeman et al. ............. 714/811 |
| 5,444,780 A * | 8/1995 | Hartman, Jr. ................. 380/30 |
| 5,629,980 A * | 5/1997 | Stefik et al. ................... 705/54 |
| 5,790,780 A * | 8/1998 | Brichta et al. ................. 714/46 |
| 5,845,297 A | 12/1998 | Grimsrud et al. |
| 6,002,772 A * | 12/1999 | Saito ........................... 705/58 |
| 6,105,117 A | 8/2000 | Ripley |
| 6,275,559 B1 * | 8/2001 | Ramani et al. .................. 378/4 |
| 6,301,663 B1 * | 10/2001 | Kato et al. .................... 713/176 |
| 6,487,661 B2 * | 11/2002 | Vanstone et al. ............ 713/171 |
| 6,738,878 B2 | 5/2004 | Ripley et al. |
| 6,883,097 B1 * | 4/2005 | Lotspiech et al. ........... 713/193 |
| 6,912,634 B2 | 6/2005 | Ripley et al. |
| 6,957,343 B2 | 10/2005 | Ripley et al. |
| 7,013,010 B2 | 3/2006 | Ripley |
| 7,111,169 B2 | 9/2006 | Ripley et al. |
| 7,111,175 B2 | 9/2006 | Ripley |
| 7,145,492 B2 * | 12/2006 | Hirano et al. ................ 341/143 |
| 7,155,591 B2 | 12/2006 | Ripley et al. |
| 7,305,086 B2 | 12/2007 | Ripley |
| 7,305,711 B2 | 12/2007 | Ellison et al. |
| 7,392,381 B2 | 6/2008 | Traw et al. |
| 2002/0114489 A1 | 8/2002 | Ripley et al. |
| 2002/0141577 A1 | 10/2002 | Ripley et al. |
| 2003/0002668 A1 | 1/2003 | Graunke et al. |

(Continued)

OTHER PUBLICATIONS

Silberschatz and Galvin, "Operating System Concepts" Fifth Edition, 1999 Wiley and sons.*

*Primary Examiner*—Benjamin E Lanier
(74) *Attorney, Agent, or Firm*—Erik R. Nordstrom

(57) ABSTRACT

In one aspect of the invention is a method for discouraging unauthorized redistribution of protected content. Content is bound to a customer I.D. associated with a customer requesting the content, such that the customer I.D. is needed to access the content.

9 Claims, 5 Drawing Sheets

U.S. PATENT DOCUMENTS

| | | |
|---|---|---|
| 2003/0068047 A1 | 4/2003 | Lee et al. |
| 2003/0226020 A1 | 12/2003 | Ripley et al. |
| 2004/0205345 A1 | 10/2004 | Ripley et al. |
| 2007/0033394 A1 | 2/2007 | Ripley et al. |
| 2008/0075284 A1 | 3/2008 | Ellison et al. |
| 2009/0177881 A1 | 7/2009 | Traw et al. |

* cited by examiner

DISCOURAGING UNAUTHORIZED REDISTRIBUTION OF PROTECTED CONTENT BY CRYPTOGRAPHICALLY BINDING THE CONTENT TO INDIVIDUAL AUTHORIZED RECIPIENTS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

This invention relates to static and dynamic information storage and retrieval. More particularly, this invention relates to methods, apparatus and systems for the protection of stored information from unauthorized copying.

BACKGROUND OF THE INVENTION

Accompanying the widespread conversion of many types of content, such as movies, music, books, etc., to digital formats has been the development of a number of systems for protecting such content against unauthorized access, reproduction, and distribution. In many such protection systems, the content is encrypted such that access requires a decryption key, which is made available under terms agreeable to the content owner/provider.

To prevent unauthorized reproduction and redistribution of such protected content, the encryption key is often also made dependent on some unique or relatively unique identifier associated with the original storage medium or device to which the content is bound. This dependency can be implemented using, for example, a cryptographic function of the identifier. If the content is copied to another storage medium or device, the decryption key formed using the identifier of that other medium or device will be different from the original encryption key, thereby preventing access to the unauthorized copy.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
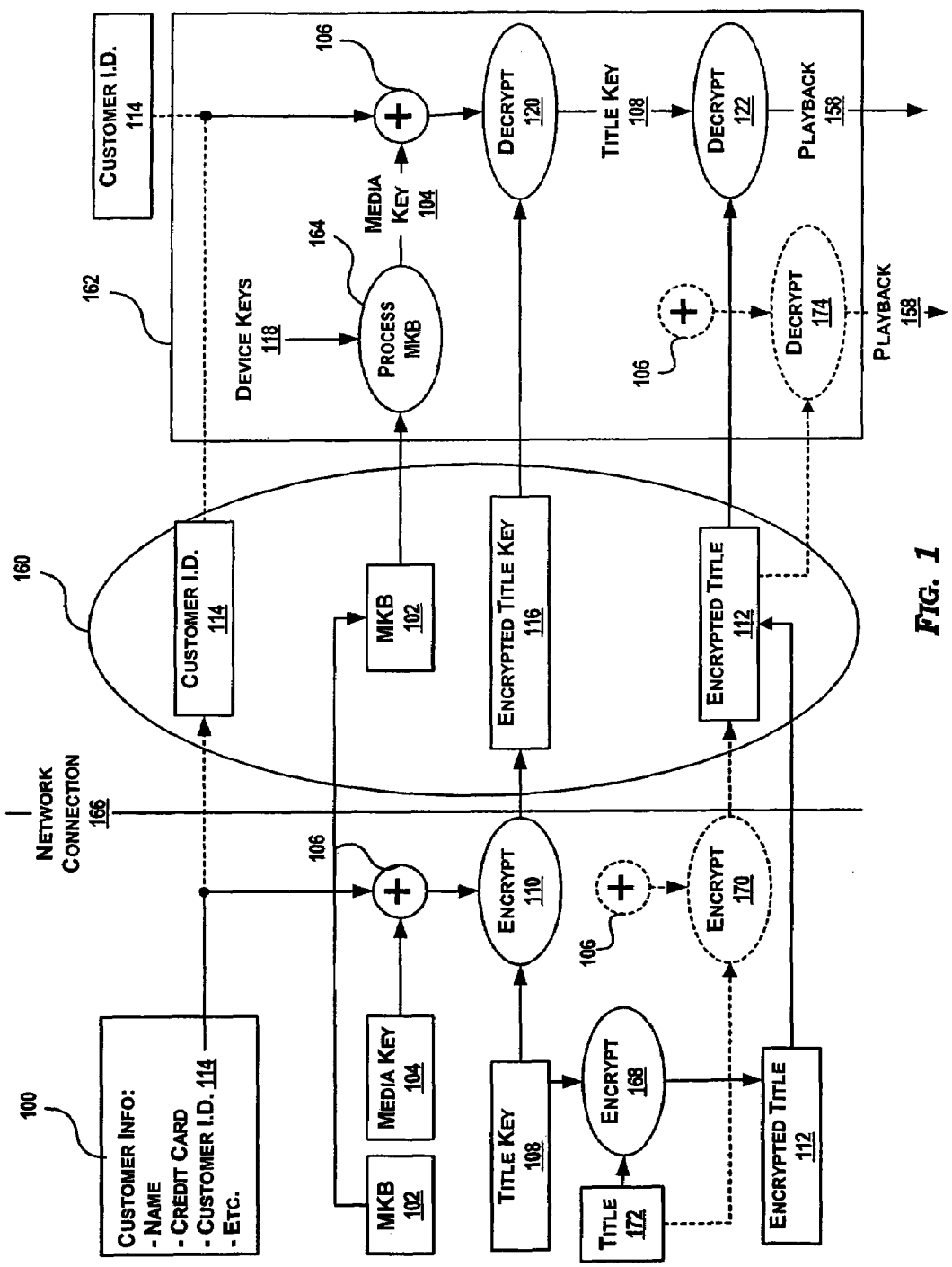
FIG. 1 is a diagram illustrating concepts and functionality within embodiments of the invention.

In one aspect of the invention, a method is disclosed for providing a means of discouraging unauthorized reproduction and redistribution of protected content by binding content to an individual to whom the content is originally provided. It may be used in conjunction with one or more other protection schemes, such as a protection scheme that binds the content to the storage medium, or it may be used in lieu of other protection schemes.

In an exemplary embodiment, an on-line service (hereinafter "service") sells digital content, such as music titles, to its customers (hereinafter "customers"). In this embodiment, a customer selects a title, and the service binds the title to an identifier associated with the customer (hereinafter "Customer I.D."). The title can then be downloaded to the customer. As a result, the Customer I.D. is needed in order to access the content. If the content is redistributed, it is useless to anyone that receives it unless the receiver also receives the Customer I.D. to which the content is bound.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or other type of media/machine-readable medium suitable for storing electronic instructions.

Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

INTRODUCTION

In embodiments of the invention, concepts used herein are derived from current schemes for content protection, including Content Protection For Recordable Media (CPRM).

Generally, a device for using content, such as for playback or recording, (hereinafter "device", such as a hardware DVD player/recorder, or a software player/recorder used in conjunction with a computer equipped with a DVD drive) is given a set of n Device Keys denoted $K_{d\_0}, K_{d\_1}, \ldots, K_{d\_(n-1)}$. These keys are provided by the 4C Entity, LLC, and are for use in processing the MKB (Media Key Block) to calculate the Media Key ($K_m$). Key sets may either be unique per device, or used commonly by multiple devices.

For each Device Key there is an associated Column and Row value, referred to as Cd_i and Rd_i (i=0, 1, ..., n−1)

respectively. Column and Row values start at 0. For a given device, no two Device Keys will have the same associated Column value (in other words, a device will have at most one Device Key per Column). It is possible for a device to have some Device Keys with the same associated Row values. The number of Device Keys that are given to each device and the range of Column and Rows values that are possible may be defined separately for each device type. A device treats its Device Keys as highly confidential, and their associated Row values as confidential.

In the case of content protected by CPRM, for example, on a DVD (Digital Versatile Disc), media manufacturers place the following on each piece of CPRM compliant media:

A prerecorded Media Identifier ($ID_{media}$).
A prerecorded Media Key Block (MKB).

CPRM recorders then record the following onto a writable area of the compliant media:

An encrypted title key.
An encrypted title (i.e. content encrypted using the title key).

Media Identifier

A Media Identifier comprises a value on which access to protected content depends. Typically, the value is unique for every medium.

Media Key Block

The Media Key Block (MKB) is generated by the 4C Entity, LLC, and allows all compliant devices, each using their set of secret Device Keys, to calculate the same Media Key (Km). If a set of Device Keys is compromised in a way that threatens the integrity of the system, an updated MKB can be released that causes a device with the compromised set of Device Keys to calculate a different Km than is computed by the remaining compliant devices. In this way, the compromised Device Keys are "revoked" by the new MKB.

An MKB is formatted as a sequence of contiguous records, where each record begins with a record type field, followed by a record length field. An MKB is part of an MKB Frame that is constructed from n MKB Packs having data. Each MKB Frame begins with an MKB Descriptor, which is part of the first MKB Pack, or MKB Pack #0. Each of the first n−1 MKB Packs are filled completely. The nth MKB Pack may end up with unused bytes, which are zero-filled.

In order to process the MKB, each authorized device receives a set of "n" Device Keys. Using its Device Keys, a device calculates the Media Key by processing records of the MKB one-by-one from first to last. After processing of the MKB is completed, the device uses the most recently calculated Media Key value as the final value for the Media Key.

If a device correctly processes an MKB using Device Keys that are revoked by that MKB, the resulting final Media Key will have the special value OH, where H designates a hexadecimal number. This special value will never be an MKB's correct final Media Key value, and can therefore always be taken as an indication that the device's keys are revoked. If a device calculates this special Media Key value, it stops the authentication, playback, or recording session in progress, and will not use that Media Key value in any subsequent calculations.

A properly formatted MKB will have exactly one Verify Media Key Record (VMKR) as its first record. The VMKR contains the hexadecimal value DEADBEEF encrypted with the correct, final Media Key. The presence of the VMKR is mandatory, but the use of the VMKR by a device is not mandatory. A device may attempt to decrypt the VMKR using its current Media Key value during the processing of subsequent Records, checking each time for the hexadecimal value DEADBEEF. If the device successfully decrypts the VMKR, the device has already calculated the correct final Media Key value, and may therefore stop processing the MKB.

A properly formatted MKB will have exactly one calculate Media Key record (CMKR). Devices must ignore any CMKRs encountered after the first one in an MKB. The CMKR includes a column field. The column field indicates the associated column value for the Device Key to be used with this record. The CMKR also contains encrypted key data in each column corresponding to each of the Device Key rows. Before processing the CMKR, the device checks that the device has a Device Key with associated column value $Cd\_i$=column, for some i.

If the device does not have a Device Key with the associated column value, the device ignores the rest of the CMKR. Otherwise, using the value i from the condition above, the Device Key and $r=Rd\_i$, $c=Cd\_i$, the device decrypts a Media Key value from the encrypted key data for row $r=Rd\_i$. The resulting Media Key value becomes the current Media Key value.

A properly formatted MKB may have zero or more conditionally calculated Media Key records (C-CMKR). The C-CMKR contains encrypted conditional data. In the columns, the C-CMKR contains doubly encrypted key data. If decrypted successfully, as described below, the encrypted conditional data contains the hexadecimal value DEADBEEF and the associated column value for the Device Key to be used with this C-CMKR. Using its current Media Key value, the device decrypts conditional data from the encrypted conditional data.

Before continuing to process the Record, the device checks that the following conditions are true: the decrypted conditional data contains the hexadecimal value DEADBEEF and the device has a Device Key with a newly associated column value (i) decrypted from the conditional data. If any of these conditions is false, the device ignores the rest of the C-CMKR. Otherwise, using the value i from the condition above, the current Media Key value, and $r=Rd\_i$, $c=Cd\_i$, the device decrypts the doubly encrypted key data at the associated column in the C-CMKR. The device then decrypts the result of the first decryption of the doubly encrypted data using the device's i-th Device Key. The resulting Media Key becomes the current Media Key value.

Media Key

When compliant media is placed within a compliant device, a secret Media Key is generated by the device using its secret keys and the Media Key Block stored on the media itself. The same Media Key is generated regardless of which compliant device is used to access the media.

Encrypted Title and Title Key

Content stored on the media is encrypted/decrypted by a Content Key derived from a one-way function of a secret Title Key and the copy control information (CCI) associated with the content. Encrypted content is hereinafter referred to as "encrypted title". Under the CPRM content protection scheme, the Title Key is encrypted and stored on the media using a key derived from a one-way function of the Media Key and Media ID. The Title Key can subsequently be used to decrypt the content.

Exemplary Embodiment

In one exemplary embodiment, many concepts related to CPRM, as discussed above, are utilized. In one exemplary embodiment, the invention may be used by an on-line service selling digital content, such as music titles, to its customers. In this embodiment, a Media I.D. corresponding to the original storage medium on which the content is stored is not used (possibly because such ID is not present for the given type of storage media). Instead, a Customer I.D. is obtained that corresponds to a customer purchasing digital content. In the case of music, digital content comprises a music title (hereinafter "title"), for instance.

Typically, the online service holds music titles (i.e., Content) in encrypted form (Encrypted Title). In an exemplary embodiment, each title is associated with a secret Title Key with which the title is encrypted, and the Title Key is subsequently encrypted using the Customer I.D. (to be discussed). In alternative embodiments, however, the title may be encrypted using the Customer I.D. rather than the Title Key.

The online service also holds a Media Key Block (MKB) (rather than the MKB being placed on a medium by a media manufacturer), which is associated with a secret Media Key that is used by an exemplary embodiment to encrypt the Title Key. Both the Title Key and Media Key are subsequently used by a device to decrypt the Encrypted Title. (Where content is bound to a Media I.D., instead of a Customer I.D., the Media I.D. is used with the Media Key to encrypt the Title Key.) In alternative embodiments, the secret Media Key may be used to encrypt the title, and subsequently to decrypt the Encrypted Title.

Binding Content to Customers

As shown in FIG. 1, when a Customer selects a music title for purchase, certain Customer Information 100 is entered and/or generated, including the Customer I.D. 114, and other information such as the Customer's name, and credit card information. In FIG. 1, the left side of the Network Connection 166 represents the Service, and the right side of the Network Connection 166 represents the Customer.

The Customer I.D. 114 need not be secret, and may be anything uniquely associated with the Customer. For instance, it could be a full name, login name, or credit card number. Alternatively, it could be a cryptographic hash of one or more of these, or other, values. As another alternative, the Customer I.D. 114 can simply be a unique number assigned to each individual Customer, using a predetermined function by the on-line service. The Customer I.D. may be provided by the Customer, or automatically generated, for instance.

In an exemplary embodiment in which the title 172 is encrypted 168 using the Title Key 108, the Title Key 108 associated with the selected title is encrypted 110 using a combination 106 (such as a cryptographic one-way function) of the secret Media Key 104 provided by the Service, and the Customer I.D. 114 corresponding to the Customer. In alternative embodiments (shown in broken lines) in which the title 172 is encrypted 170 using the Customer I.D. 114, the selected title is encrypted 170 using a combination 106 (such as a cryptographic one-way function) of the secret Media Key 104 provided by the Service, and the Customer I.D. 114 corresponding to the Customer.

The MKB 102, Encrypted Title 112, and Encrypted Title Key 116 are also transferred to the Customer, where it can be stored onto a storage medium 160, such as a hard drive or a CD-R disc, which can then be played by the Customer on a device 162.

Figure 2:
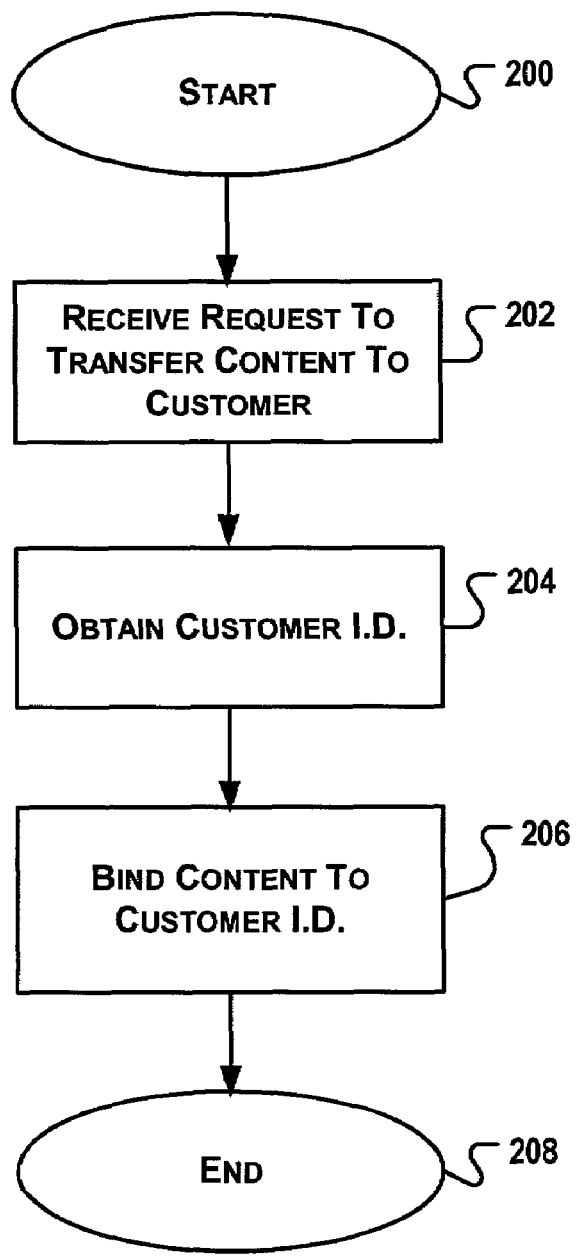
FIG. 2 is a high level flow chart illustrating a method to bind content to a customer identifier in accordance with embodiments of the invention.

FIG. 2 illustrates a high-level method of binding content to a customer I.D. It starts at block 200 and continues to block 202 where a request to transfer content to a customer is received. At block 204, a customer I.D. corresponding to the customer is obtained, and at block 206, the content is bound to the customer I.D. The method ends at block 208.

Figure 3:
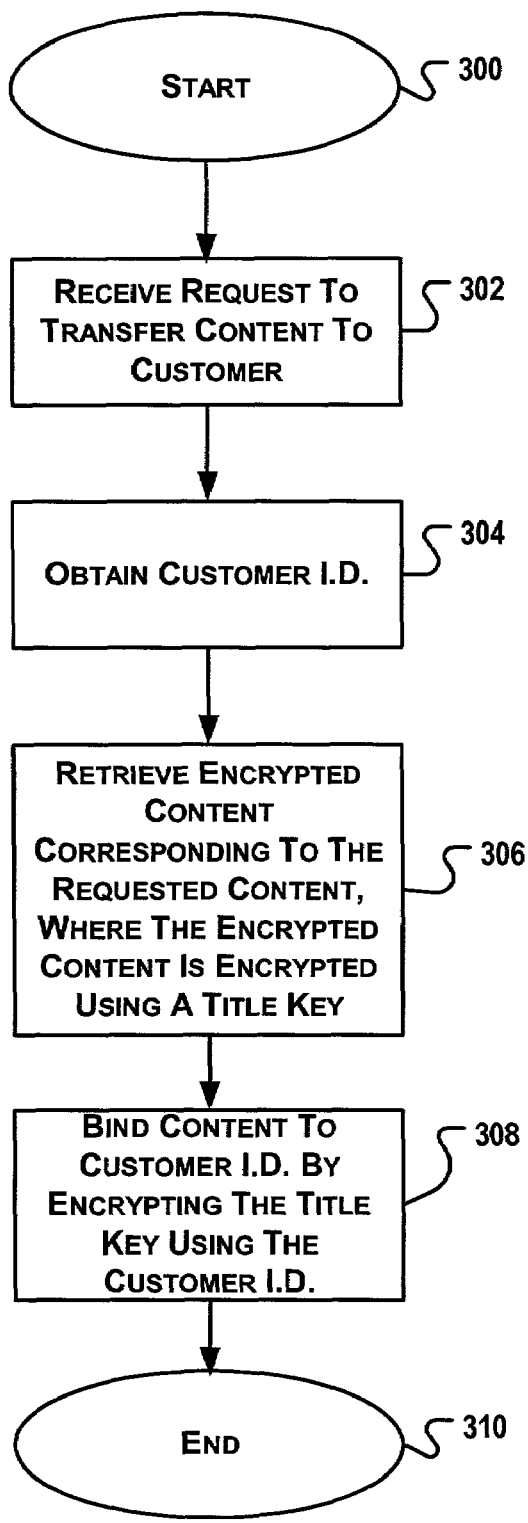
FIG. 3 is a high level flow chart illustrating a method to access content that is bound to a customer identifier in accordance with exemplary embodiments of the invention.

FIG. 3 illustrates a detailed method in exemplary embodiments of binding content to a customer I.D. It starts at block 300 and continues to block 302 where a request to transfer content to a customer is received. At block 304, a customer I.D. corresponding to the customer is obtained. At block 306, encrypted content corresponding to the requested content is retrieved, where the encrypted content is encrypted using a title key. At block 308, the content is bound to the customer I.D. by encrypting the title key using the customer I.D. The method ends at block 310.

Accessing Content Bound to Customer I.D

In reference back to FIG. 1, the Customer can then connect the storage medium 160 to a device 162, such as a fixed-function player device, or a computer running player software, for playback. The device 162 reads the MKB 102 from the storage medium 160, and uses its Device Keys 118 to process 164 the MKB 102 in order to calculate the secret Media Key 104.

In an exemplary embodiment in which the title 172 is encrypted using the Title Key 108, the device 162 reads the Encrypted Title Key 116 from the storage medium 160, and decrypts 120 it using the same combination 106 of the secret Media Key 104 and the Customer I.D. 114 that was used to encrypt the Title Key 108. The result of the decryption 120 is the Title Key 108.

In one embodiment, the Customer I.D. 114 is taken from the Customer Information 100, transferred to the Customer over the Network Connection 166, and stored on the medium 160. In this embodiment, the content is readily reproducible and redistributable since the Customer I.D. that is needed to decrypt the content exists on the medium; however, the existence of the Customer I.D. on the medium along with the content acts as a deterrence to distribute the content since the customer knows that the Customer I.D. can be traced back to the customer.

In another embodiment, the Customer I.D. 114 may be provided by some other means, such as via user input, or otherwise reading it from a system or device local to the user. In this embodiment, the content cannot be reproduced/redistributed unless the correct Customer I.D. 114 is provided via the means.

In an exemplary embodiment in which the title 172 is encrypted using the Title Key 108, the device 162 reads the Encrypted Title 112 from the storage medium 160, and decrypts 122 it using the Title Key 108 for the purpose of playback 158. In alternative embodiments in which the title 172 is encrypted using the Customer I.D. 114, the device 162 reads the Encrypted Title 112 from the storage medium 160, and decrypts 174 it using the combination of the Customer I.D. 114 and the Media Key 104. The decrypted title is then available for playback 158.

Figure 4:
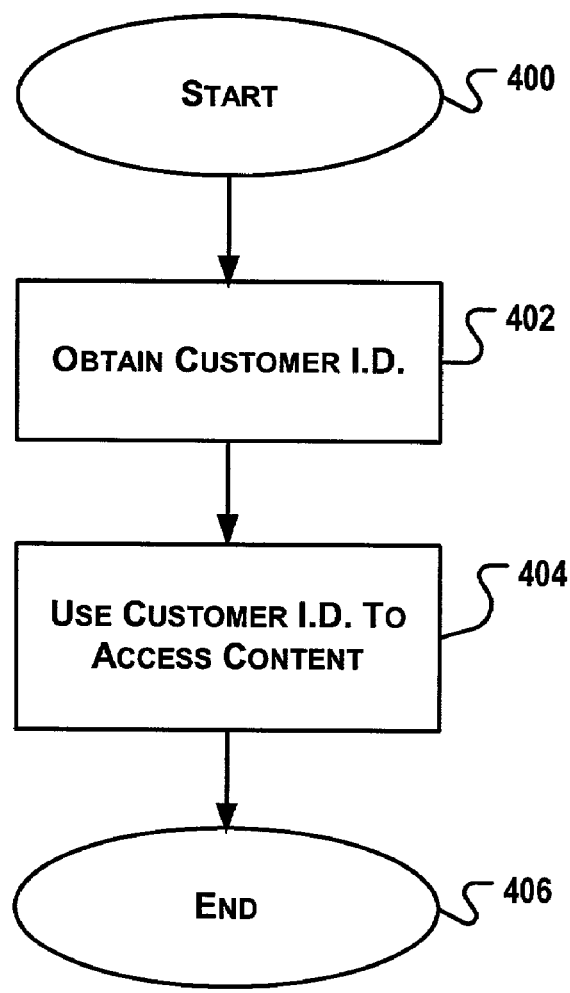
FIG. 4 is a detailed flow chart illustrating a method to bind content to a customer identifier in accordance with embodiments of the invention.

FIG. 4 illustrates a high-level method of accessing content that is bound to a customer I.D. The method starts at block 400. At block 402, a customer I.D. is obtained from a customer attempting to access the content. At block 404, the customer I.D. is used to access the content. The method ends at block 406.

Figure 5:
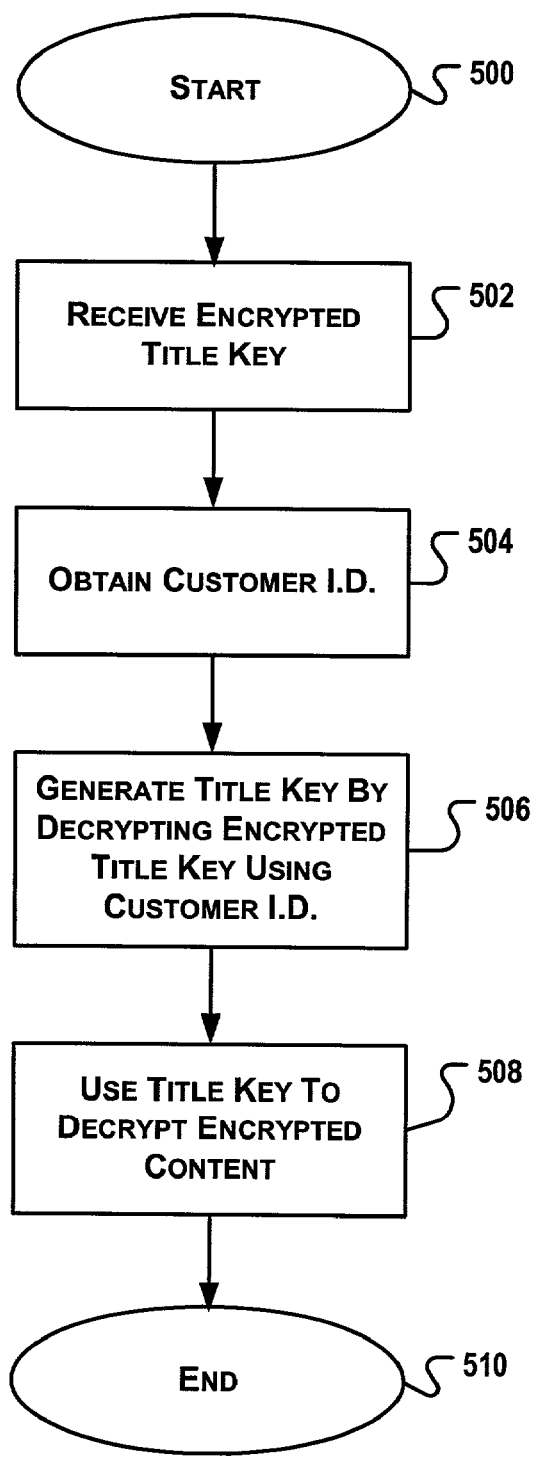
FIG. 5 is a detailed flow chart illustrating a method to access content that is bound to a customer identifier in accordance with exemplary embodiments of the invention.

FIG. 5 illustrates a detailed method in exemplary embodiments of accessing content that is bound to a customer I.D.

The method starts at block 500. At block 502, the encrypted title key is obtained (i.e., from the medium onto which it is stored from the on-line service), and at block 504, a customer I.D. is obtained from a customer attempting to access the content. At block 506, the encrypted title key is decrypted using the customer I.D, resulting in a title key, and at block 508, the title key is used to decrypt the encrypted content. The method ends at block 510.

CONCLUSION

Thus, embodiments of the invention provide an additional or an alternative means for discouraging unauthorized redistribution of protected content by cryptographically binding the content to individual authorized recipients. Since a Customer's identification is bound to a title purchased by the Customer, Customers are further deterred from unauthorized distribution since the title is bound to the Customer and can be traced back to the Customer.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

While several exemplary embodiments have been described, it should be understood by one of ordinary skill in the art that concepts of this invention are not limited to embodiments discussed herein. For example, concepts of the invention are not limited to the CPRM content protection scheme. As another example, while exemplary embodiments illustrate music titles as content, content is not so limited, and may include other information that is accessed, such as video data and software programs.

What is claimed is:

1. A method comprising:
   with at least one server, receiving a request to transfer content to a customer;
   with the at least one server, retrieving from a content source encrypted content corresponding to the requested content, the encrypted content being encrypted by a title key;
   with the at least one server, obtaining a customer identifier (I.D.) associated with the customer;
   with the at least one server, binding the requested content to the customer I.D. by using the customer I.D. combined with a media key provided by the content source to encrypt the title key;
   with the at least one server, transferring from the content source the encrypted content and the encrypted title key to a non-volatile storage medium; and
   with the at least one server, storing the encrypted content and the encrypted title key on the non-volatile storage medium, from which the encrypted content and the encrypted title key may be accessed by the customer.

2. The method of claim 1, wherein said combining the customer I.D. with a media key comprises using a crypto-graphic one-way function.

3. A memory storage device having stored thereon data representing sequences of instructions, the sequences of instructions which, when executed by a processor, cause the processor to perform the following:
   receive a request to transfer content to a customer;
   retrieve from a content source encrypted content corresponding to the requested content, the encrypted content being encrypted by a title key;
   obtain a customer identifier (I.D.) associated with the customer;
   bind the requested content to the customer I.D. combined with a media key provided by the content source by using the customer I.D. to encrypt the title key;
   transferring from the content source the encrypted content and the encrypted title key to a non-volatile storage medium; and
   storing the encrypted content and the encrypted title key on the non-volatile storage medium, from which the encrypted content and the encrypted title key may be accessed by the customer.

4. A memory storage device having stored thereon data representing sequences of instructions, the sequences of instructions which, when executed by a processor, cause the processor to perform the following:
   access from a non-volatile storage medium content encrypted with a title key accessible by a customer, the non-volatile storage medium additionally storing a customer I.D. associated with the customer requesting the content, a Media Key Block (MKB), and
   the title key that is encrypted (encrypted title key) with a customer I.D., said processor to access content by:
   processing the MKB to generate a Media Key by using Device Keys associated with a device for using the content;
   decrypting the encrypted title key to form the title key by reading a customer I.D., and combining the customer I.D. and the Media Key; and
   using the title key to decrypt the encrypted content.

5. The memory storage device of claim 4, wherein the instructions that cause the processor to combine the customer I.D. and the Media Key comprises instructions that cause the processor to use a crypto-graphic one-way function.

6. The memory storage device of claim 4, wherein the content comprises a music title.

7. A system, comprising:
   a storage medium;
   a computer system connected to the storage medium, the computer system to:
   access from a storage medium content encrypted with a title key, the storage medium additionally storing a customer I.D. associated with a customer requesting the content, a Media Key Block (MKB), and the title key that is encrypted (encrypted title key) with a customer I.D., the computer to access the encrypted content by:
   processing the MKB to generate a media key by using Device Keys associated with a device for using the content;
   decrypting the encrypted title key to form the title key by reading a customer I.D., and combining the customer I.D. and the Media key;
   using the title key to decrypt the encrypted content.

8. The system of claim 7, wherein the computer system combining the customer I.D. and the Media Key comprises the computer using a cryptographic one-way function.

9. The system of claim 7, wherein the content comprises a music title.

* * * * *